United States Patent [19]
Ham

[11] 3,721,901
[45] March 20, 1973

[54] ZERO-RESET MECHANISM FOR AN INDICATING DEMAND REGISTER

[75] Inventor: Donald M. Ham, Rochester, N.H.

[73] Assignee: General Electric Company

[22] Filed: Aug. 24, 1971

[21] Appl. No.: 174,460

[52] U.S. Cl............324/103 R, 74/409, 235/144 MA
[51] Int. Cl. .............................................G01r 19/16
[58] Field of Search ...........324/103 R; 235/144 SP, 144 DM, 144 MA; 74/409

[56] References Cited
UNITED STATES PATENTS 3,586,974   6/1971   Ham et al. ......................324/103 R
3,105,731   10/1963   Bertrang................................74/409
2,427,159   9/1947   Poole ....................................74/409

Primary Examiner—Rudolph V. Rolinec
Assistant Examiner—Ernest F. Karlsen
Attorney—Francis X. Doyle et al.

[57] ABSTRACT

A zero-reset mechanism is provided for accurately and consistently resetting the rotatable indicating pointers of a dial register of a demand meter to zero. The reset mechanism includes a pre-loaded spring that cooperates with an adjustable stop member to return the indicating pointers of the dial register to their zero positions, after they have been manually driven in a down-scale direction past their zero indicating position.

9 Claims, 7 Drawing Figures

Inventor,
Donald M. Ham,
by Vale P. Myles
His Attorney.

Inventor,
Donald M. Ham,
by Vale P. Myles
His Attorney.

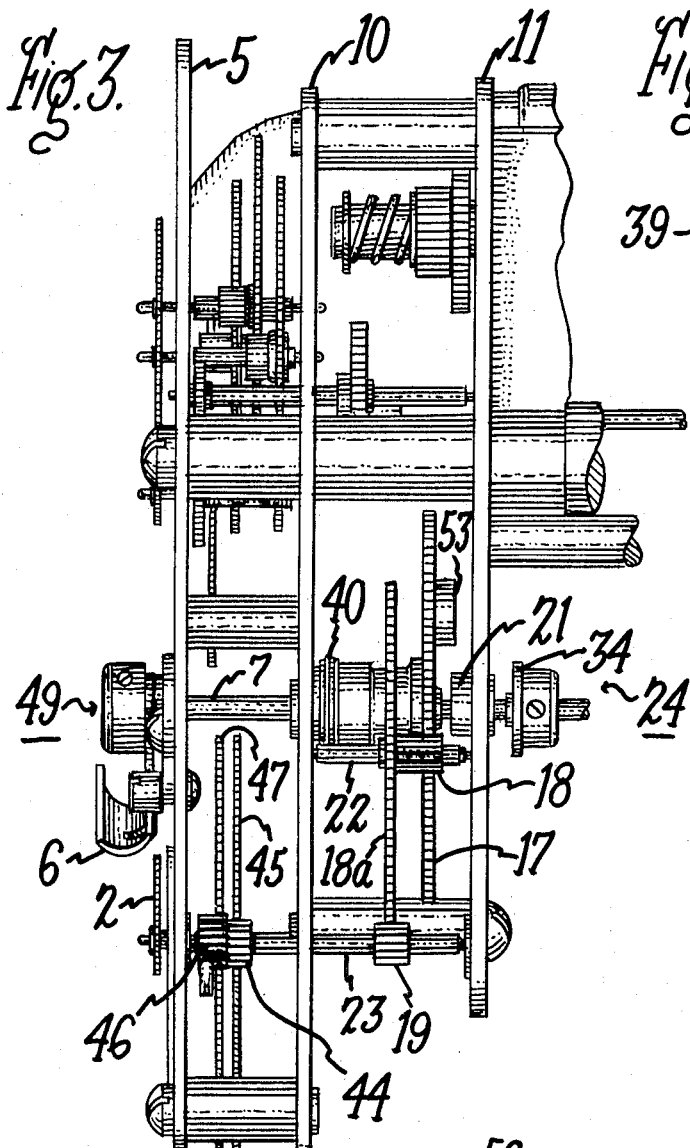
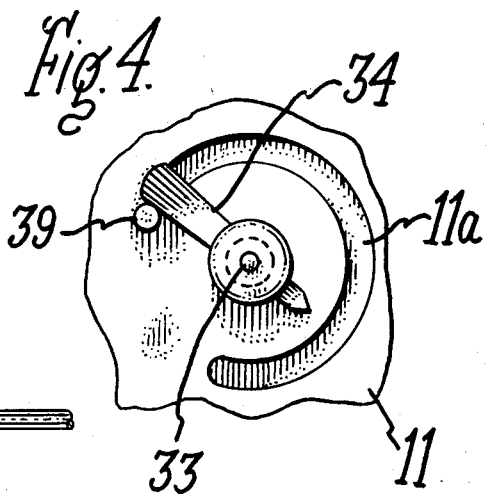
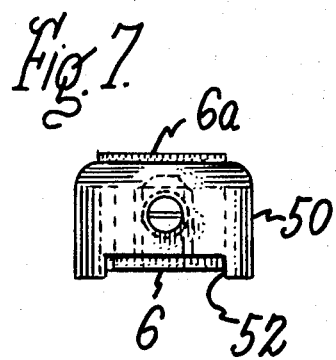
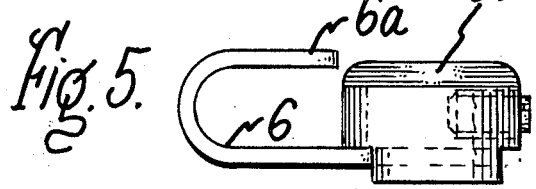
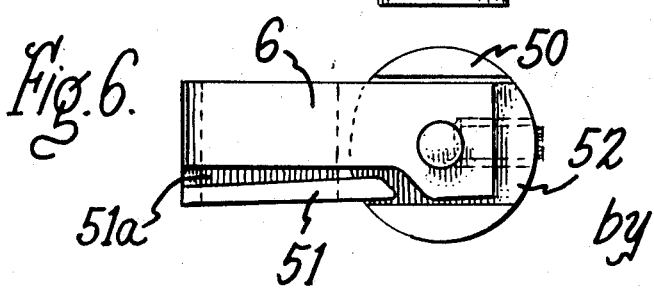

ZERO-RESET MECHANISM FOR AN INDICATING DEMAND REGISTER

BACKGROUND OF THE INVENTION

The present invention relates to an indicating kilowatt demand meter of the integrating type. More particularly, the invention relates to a manually operable zero-reset mechanism for returning the indicating pointers of a dial register for such a demand meter to a zero-indicating position.

Electric demand meters are well known in the prior art. A common type of demand meter currently in use by the electric utility industry uses a conventional watthour meter mechanism, in combination with a timing element, to sum up the kilowatt hours of energy measured by the meter in a pre-selected time interval. Usually, a time interval of 15 or 30 minutes is selected for such meters. In order to indicate the maximum power demand on a customer's system in a given billing period, such as during a 1-month span, a recording mechanism is incorporated in all demand meters. One conventional form of such a recording mechanism comprises a simple pointer-pusher device that pushes an indicating pointer up-scale as it is rotated by the watthour mechanism during a given demand interval. Thus, the pointer will record the maximum power demand measured by the meter during any demand interval occurring in the billing period. At the end of such a billing period, the indicating pointer is manually reset to its zero-indicating position. Of course, it is necessary to accurately reset the indicating pointer at its zero position, if the subsequently recorded demand measurements of the meter are to be accurate.

In addition to utilizing a single rotatable indicating pointer to record demand measurements, it is common practice to provide demand meters with dial registers having a plurality of rotatable indicating pointers that are connected to a decade-type gear train, which is driven in an up-scale direction by being coupled through a drive gear train to the above-mentioned type of pointer-pusher demand meter mechanism. In order to reset the plural indicating pointers of such a dial register to their zero position at the end of a month, or other selected billing period, it is desirable to couple these pointers to the type of manually-resettable pointer mentioned above, so that a single reset operation is effective to return both the dial register pointers and the single indicating pointer to their respective zero positions.

One difficulty encountered in prior art demand register reset mechanisms is that the inherent backlash in the gear train used to drive the indicating pointers can introduce a significant error into the demand recording pointer when it is reset. In a dial type register utilizing decade-gear train driven dial pointers to indicate demand, the magnitude of this random backlash error may be as much as half a dial pointer revolution of the most sensitive pointer.

Another difficulty present in prior art zero-reset mechanisms involves the problems inherent in accurately calibrating the mechanism to a zero position, when it is initially manufactured. It is desirable to be able to effect such a calibrating operation in a simple and efficient manner, without requiring special tools or disassembly of either the mechanism, or the meter on which it is mounted. It is common practice in prior art demand meters to provide an initial zero-calibration for an indicating pointer by mounting a calibrating screw on the pointer-pusher of the meter. Since this pointer-pusher mechanism is normally positioned in the gear train of the meter, it is relatively difficult to adjust, compared with a calibrating means that is located at one end of the drive gear train, and can be adjusted at the front of the meter, without disassembling the meter.

Another problem inherent in some prior art indicating pointer zero-reset mechanisms is that they tend to impose an undesirable strain on the pointer drive gear train when the indicating pointers of a dial register are reset to their zero position. This problem is generally peculiar to those zero-reset mechanisms in the prior art that are operated by moving an indicating pointer in a down-scale direction past its zero-indicating point sufficiently far to over-run any backlash present in its associated drive gear train. In this type of mechanism, after the effect of backlash has been overcome, the pointer is then moved up-scale to set it accurately at its zero-indicating position.

A primary object of the present invention is to provide a zero-reset mechanism for accurately resetting a gear-train-actuated indicating pointer to a zero indicating position in a more efficient and reliable manner than is possible with prior art mechanisms.

Another object of the invention is to provide a zero-reset mechanism for a demand meter, which includes a calibrating means for adjusting the initial zero-indicating position of the pointer with an adjustment device that is easily accessible from the front of the meter.

A further object of the invention is to provide a simple, manually-operable zero-reset mechanism for a gear-train driven rotatable pointer that allows the pointer to be manually moved to a position below its zero-indicating point, from which a stored energy device accurately returns the pointer to its zero position in an up-scale direction, so that any backlash present in the drive gear train does not introduce an indicating error in the positioning of the pointer at its zero position.

Still another object of the invention is to provide a simplified zero-reset mechanism for an indicating dial register of a demand meter, in which counter-balance means are included to essentially nullify any mechanical unbalance in the drive gear train of the mechanism.

An additional object of the invention is to provide an accurate zero-reset mechanism for the indicating demand pointer of a demand meter, while at the same time maintaining the load requirements of the mechanism on the watthour meter measuring mechanism sufficiently low to avoid adversely affecting the measurements indicated by the meter.

Those skilled in the art will recognize additional objects and advantages of the invention from the description of it that follows taken in conjunction with the accompanying drawings.

SUMMARY OF THE INVENTION

In one preferred embodiment of the invention, a multi-dial indicating demand register is provided with a manually operable zero-reset mechanism comprising a pivotally mounted lever arm that is rigidly coupled to one gear of a drive gear train that rotates the indicating pointers of the dial register. The pivotally mounted lever arm is provided with a pre-loaded spring portion that is adapted to be moved into engagement with an adjustable stop member when the lever arm is manually pivoted to drive the gear train thereby causing it to move the indicating pointers of the demand register to a position below their zero-indicating position. The pre-loaded spring is operable to move the indicating pointers up-scale to exactly their zero-indicating position, thereby to prevent the introduction of any error in the demand measurement subsequently indicated by the pointers, due to backlash tolerances in the drive gear train.

BRIEF DESCRIPTION OF THE DRAWINGS

FIG. 3 is a fragmentary side elevation view of the faceplate and meter operating mechanism illustrated in FIG. 2 of the drawing, taken from the right side of FIG. 2, showing a portion of the gear train utilized to drive the indicating pointers of the multi-dial demand register.

FIG. 4 is a fragmentary plan view from the back side of the meter assembly shown in FIG. 2, depicting an important structural feature of the zero-reset mechanism of the present invention.

FIG. 5 is a side view, taken with respect to the meter face shown in FIG. 1, illustrating a preferred form of a manually operable, reset lever arm of the present invention.

FIG. 6 is a bottom view, taken with respect to the drawing in FIG. 5, showing the manually operable lever illustrated in FIG. 5, and specifically illustrating a novel preloaded spring feature of the present invention.

FIG. 7 is an end view of the manually operable reset lever illustrated in FIGS. 5 and 6.

BRIEF DESCRIPTION OF A PREFERRED EMBODIMENT

Figure 1:
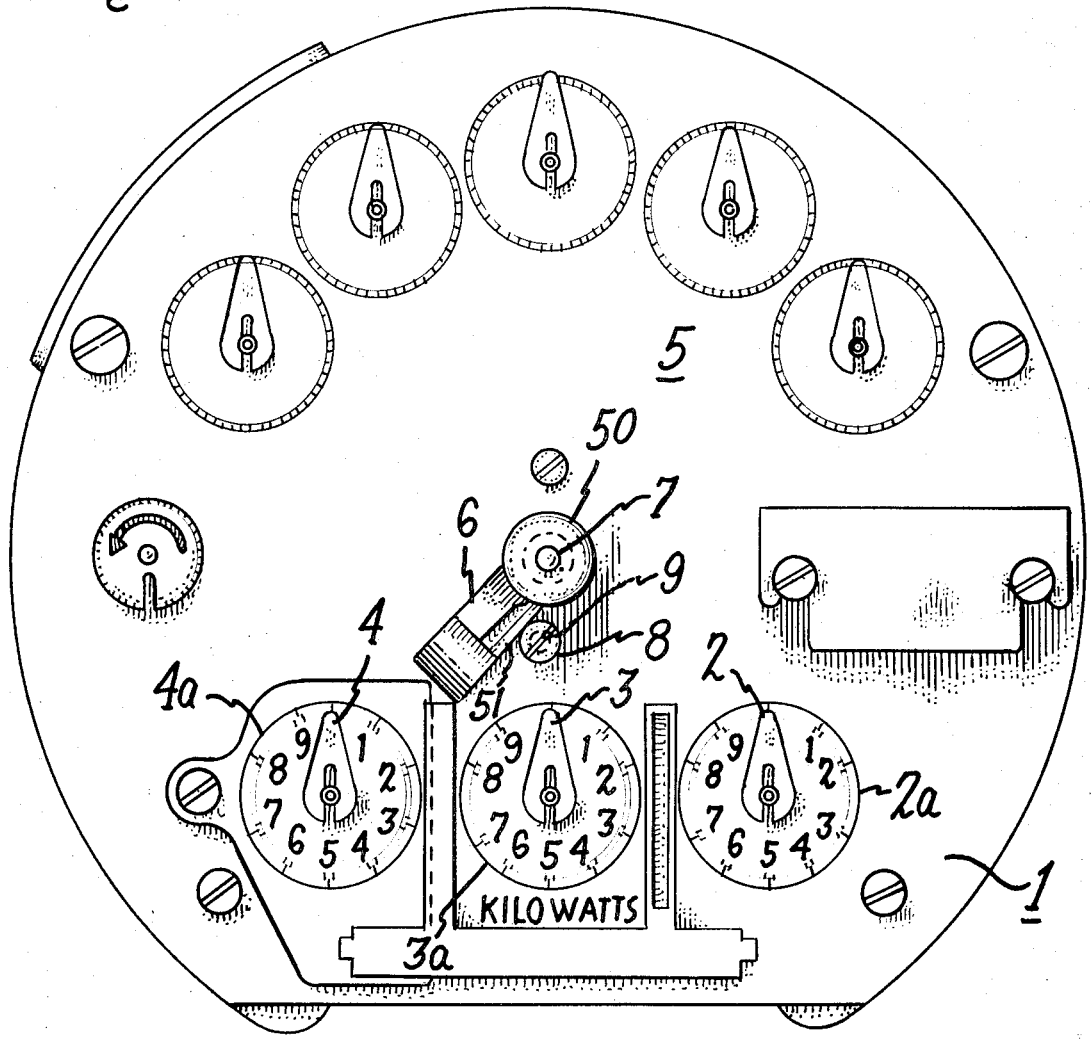
FIG. 1 is a front plan view of a combination electric demand meter and watthour meter, illustrating a multi-dial demand register, in combination with a rotatably mounted, manually operable lever arm and an adjustable stop member that comprise important features of the zero-reset mechanism of the present invention.

Referring now to FIG. 1 of the drawing, it will be seen that there is shown a multi-dial register 1 of a conventional type that is suitable for measuring electrical demand in kilowatts. The register 1 has a plurality of rotatably mounted indicating pointers 2, 3 and 4 which are positioned to cooperate, respectively, with numbered dial scales 2a, 3a and 4a. As is usual practice with conventional indicating demand meters, each of the scales 2a-4a is divided into a decade scale. The number of kilowatts recorded by the demand register 1 is easily read by noting the positions of the three pointers 2-4 with respect to the numbers on the dials 2a-4a. It will be understood that the indicating pointers 2-4 are mounted in any suitable conventional manner for rotation with respect to the meter faceplate 5, and the dial scales 2a-4a are mounted on faceplate 5 in fixed relationship to it.

Positioned directly above the center pointer 3 is a manually operable lever arm 6 that is mounted in fixed relationship to a rotatable shaft 7. The lever arm 6 is shown in engagement with an adjustable stop member 8 that is eccentrically mounted on a pin 9, which, in turn, is rotatably supported on the faceplate 5. A more detailed description of the structure and function of these component parts will be given below. The additional rotatable pointers shown at the top of faceplate 5 may be used to indicate electric power consumption in watthours. Since these additional pointers and their associated drive mechanisms do not form any part of the present invention, they are not described further herein.

Figure 2:
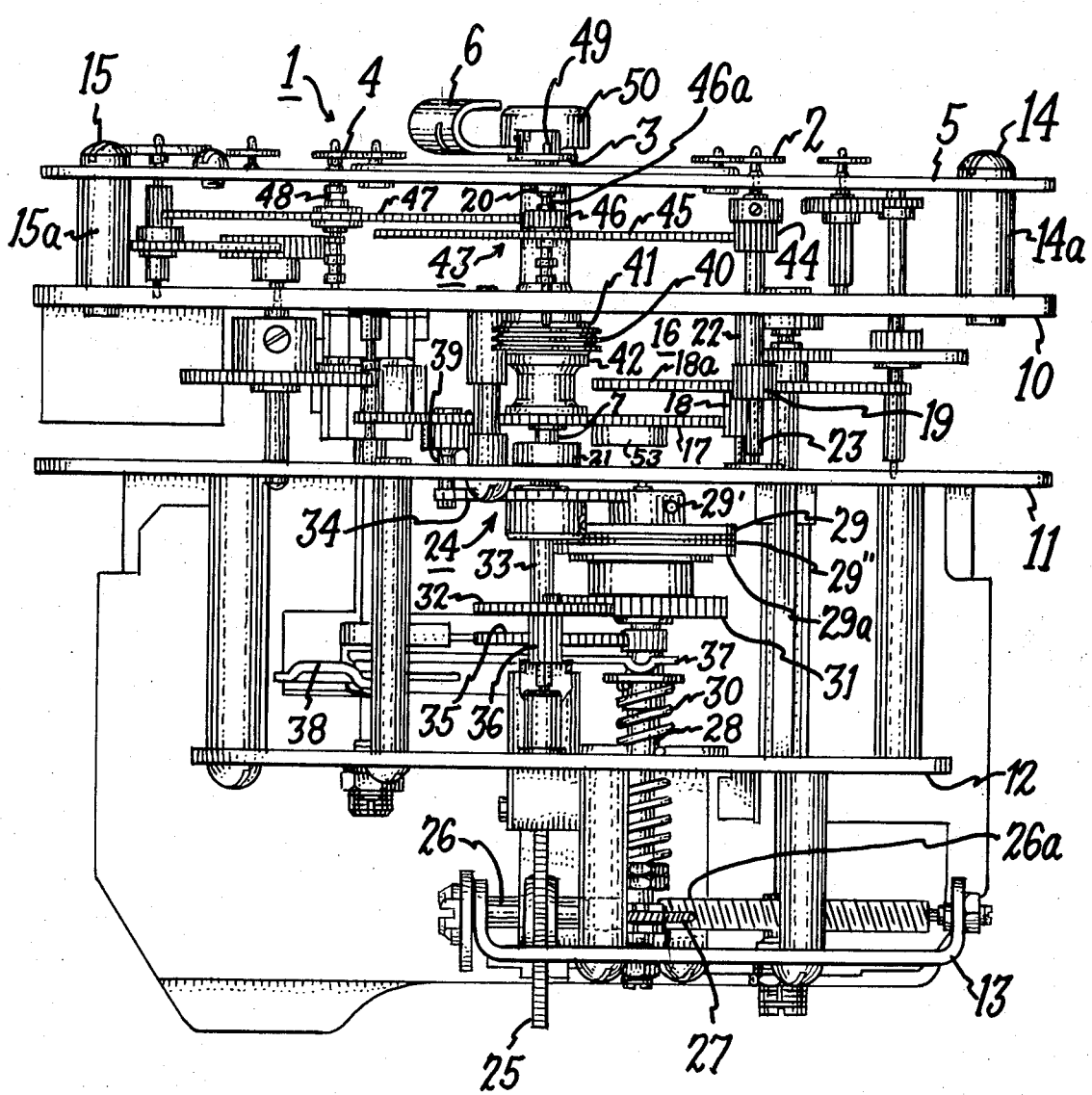
FIG. 2 is a bottom view of the combination watthour and demand meter faceplate and register assembly illustrated in FIG. 1, showing some of the operating mechanism and drive-gear trains of the meter in relation to other components of the zero-reset mechanism of the present invention.

Throughout the drawings of FIGS. 1-7, like reference numerals are used to identify identical parts. Thus, in FIG. 2 it can be seen that the meter face plate 5 is rigidly mounted in spaced-apart relationship to a plurality of additional metal mounting plates 10, 11, 12 and 13. Any conventional mounting means may be used to achieve the desired support and spacing of the plates 10-13; however, in order to simplify the drawing of FIG. 2, the normal number of such spacing means has not been shown therein. By way of example, it may be noted that faceplate 5 is supported in fixed relationship to plate 10 by screws 14 and 15, which are positioned through spacing cylinders 14a and 15a. Similar conventional support and spacing members may be used to hold the plates 10-13 in their respective operating positions but, although some of these spacing means are illustrated in FIG. 2, they are not specifically identified by number, since they do not form an important part of the present invention.

The novel zero-reset mechanism of the present invention, which is embodied in the demand meter illustrated in FIG. 2, will be described with respect to the above-mentioned multi-dial register 1; however, it should be understood that the reset mechanism of the invention will operate equally well with a single indicating pointer, such as the rotatably mounted pointer 2, for example. In fact, as is conventional in the demand meter art, only the drive gear of pointer 2 is directly connected to the gear train of the reset mechanism, while the pointers 3 and 4 are coupled through a conventional decade gear train to the drive gear of pointer 2.

A drive gear train 16, comprising disc gear 17, pinion gear 18, disc gear 18a, and pinion gear 19 is provided to drive indicating pointer 2 in an up-scale direction (also see FIG. 3). The respective gears 17-19 of drive gear train 16 may be rotatably mounted in any conventional manner; however, as illustrated in FIG. 2, in the embodiment of the invention being described, the disc gear 17 is staked in fixed relationship on shaft 7, which is rotatably journaled in bearings 20 and 21 on plates 5 and 11, respectively. The pinion gear 18 and disc gear 18a are mounted in fixed relationship with respect to one another on rotatable shaft 22, which is suitably mounted in conventional bearing means (not shown) in plates 10 and 11. Pinion gear 19 is mounted in fixed relationship on rotatable shaft 23, which is mounted in conventional bearing means (not shown) in plates 5, 10 and 11.

At this point in the description of the invention, it might aid an understanding of it to note that all of the gears 17-19 of gear train 16 are permanently mounted in meshing relationship. It should also be understood that disc gear 17 drives pinion gear 18, which in turn rotates shaft 22 and the disc gear 18a, which is meshed with pinion gear 19 and thus rotates shaft 23 and indicating pointer 2.

In order to drive the gear train 16 to move the pointer 2 in up-scale direction, drive means 24 are provided (see FIGS. 2 and 3). The drive means 24 in this embodiment of the invention is similar to a conventional type of pointer-pusher mechanism commonly found in prior art demand meters. It will be understood by those skilled in the art that alternative types of driving means may be used with the zero-reset mechanism of the invention without impairing its operability.

In this embodiment of the invention, the drive means 24 comprises a well-known type of interval timing mechanism and demand indicating pointer-pusher; accordingly, only a general description of the drive means 24 will be given herein. The power input for drive means 24 is provided from a disc gear 25 that is adapted to be connected in operating, driven relationship to an electro-dynamically driven rotor shaft (not shown) of a conventional watthour meter; when the demand meter assembly illustrated in FIG. 2 is mounted in operating position with respect to such a watthour meter rotor. Gear 25 is staked onto a shaft 26 which includes a worm gear section 26a. Worm gear 26a rotates gear 27, which is staked onto an axially slidable clutch shaft 28. A clutch disc 29 is locked with set screw 29' on one end of shaft 28 and is adapted to rotate with it. A second clutch disc 29a is mounted on clutch shaft 28 and biased toward the disc 29 by a compressed coil spring 30. A disc gear 31 is also rotatably mounted on shaft 28 and is driven by it through the friction coupling of felt washers 29" that are compressed between, and respectively fastened to, clutch discs 29 and 29a.

When clutch disc 29 is in driving relationship with disc 29a, gear 31 is meshed with gear 32. Gear 32 is mounted in fixed relationship on a rotatable shaft 33, which also mounts a pointer-pusher arm 34 (also, see FIG. 4). Accordingly, when gear 31 drives gear 32, the pointer-pusher arm 34 is rotated, in a manner that will be described more fully below, to drive gear train 16 so it moves indicating pointer 2 in an up-scale direction.

It will be understood that various conventional types of interval reset mechanisms may be used to return the pointer-pusher 34 to its start position at the end of a pre-selected time interval, such as 15 or 30 minutes. If a more detailed description of such an interval timer is desired, reference may be made to U.S. Pat. No. 3,586,974, which issued June 22, 1971 and is assigned to the assignee of the present invention. That patent describes one form of such an interval timer in detail and it also describes a pointer-pusher drive system similar to drive means 24, in greater detail; therefore, reference may be made to that patent if such detailed description is desired. For the purpose of understanding the present invention, it need only be understood that an interval timing function is afforded by a pivotally mounted sector gear 35 that is mounted in meshing engagement with a pinion gear 36, which is staked on the shaft 33 that supports the pointer-pusher 34 and drive gear 32. The sector gear 35 is spring-loaded so that when a pivotally mounted, cam controlled lever 37 is moved by a rotatable cam 38 to disengage clutch discs 29–29a and to move drive gear 31 out of mesh with gear 32, it forces the gear 36 to rotate in a reverse direction and thereby returns the pointer-pusher 34 to its start position. The rate of rotation of cam 38 is controlled by a synchronous drive motor (not shown), in a manner well known in the art, as is explained in detail in the above-mentioned U.S. Pat. No. 3,586,974.

The pointer-pusher 34 is positioned to engage a pin 39 that is staked to the disc gear 17 at a point thereon spaced outwardly from the axis of rotation of gear 17. The pin 39 extends through a slot 11a (see FIG. 4) in the plate member 11. In this embodiment of the invention, the slot 11a encompasses an arc of approximately 270°, around the axis of shaft 33. As shown in FIG. 4, the range of movement of the lever arm 6 is controlled by the position of the upper end of slot 11a with respect to the pin 39, since the upper end of slot 11a acts as a limit stop for the pin 39.

The operation of drive means 24 can be briefly described as follows: When in operation, input gear 25 is driven through a number of rotations in the selected measurement interval of 15 or 30 minutes, which is proportional to the power consumption measured by the watthour meter driving gear 25. Consequently, due to the driven relationship of pointer-pusher 34, with respect to input gear 25; through gears 26a, 27, 31 and 32, and clutch discs 29 and 29a, the pointer-pusher 34 is rotated in a counter-clockwise direction (as seen in FIG. 4) through an angle that is proportional to such power consumption. At the end of each such preselected 15 or 30 minute interval the pivotal lever 37 is actuated to disconnect clutch disc 29a from disc 29 and to move gear 31 out of mesh with gear 32. Then, sector gear 35 operates to return pointer-pusher 34 to its zero position.

As noted above, when the pin 39 is rotated in a counter-clockwise direction (as viewed in FIG. 4) it operates through gear train 16 to drive indicating pointer 2 in an up-scale direction. Accordingly, the up-scale movement of indicating pointer 2 is directly proportional to the maximum power consumption measured during one of the periodic intervals and recorded by movement of the pin 39. As is common in conventional demand meters, the pin 39 and, thus, indicating pointer 2, are held in their maximum "up-scale" positions until manually returned to a zero position, despite the frequent resetting of the pointer-pusher 34 to its start position at the end of each 15 or 30 minute interval.

In the preferred embodiment of the invention disclosed herein, a plurality of felt washers 40 are mounted on shaft 7 between a bearing plate 41 on plate 10 and a hub 42 that is fixed to disc gear 17. These felt washers 40 operate to friction-load the disc gear 17 to retain it in its maximum up-scale position when the pointer-pusher 34 is out of engagement with it. Various conventional means may be employed to adjust the friction drag exerted on hub 42 through washers 40. Of course, the normal friction of gear train 16 also helps to retain the gear 17 in its maximum "up-scale" position.

Before describing the zero-reset mechanism of the invention in greater detail, it should be noted that a conventional decade gear train 43 (see FIGS. 3 and 4) is provided to drive the plurality of pointers 2–4 of the multi-dial demand register 1. The decade gear train 43 comprises a first pinion gear 44 mounted in fixed relationship on shaft 23; a disc gear 45 mounted in fixed relationship with respect to a pinion gear 46, both of which are rotatable on a suitable shaft 46a, which is supported between plates 5 and 10; and a disc gear 47 that is mounted in fixed relationship on rotatably mounted shaft 48, which also supports indicating pointer 4. As is usual for a decade gear train, pinion gear 44 makes 10 revolutions in order to drive disc gear 45 through one revolution, and pinion gear 46 makes 10 revolutions in order to drive disc gear 47 through one revolution. Of course, it will be understood that appropriate gear ratios must be selected for the drive gear train 16 in order to translate the power input detected by input gear 25 into an appropriate indication of kilowatts at the dial register 1.

Returning now to a description of the zero-reset mechanism of the invention, it will be understood that since the gear train 16 is permanently in meshing engagement with the decade gear train 43, which controls the position of the indicating pointers 2–4 of demand register 1, some means must be provided for exerting a rotating force on the gear train 16 in a reverse direction, to move the pointer 2 and, thus, pointers 3 and 4, in a down-scale direction toward their zero-indicating position. Toward that end, the zero-reset mechanism disclosed herein includes a manually operable rotatable means 49, comprising the manually operable lever arm 6 and the shaft 7, as well as a hub member 50 that is mounted on the outer end of shaft 7. It will be apparent that since the lever arm 6 is rigidly coupled to the disc gear 17 through shaft 7, when the lever arm 6 is manually rotated it will force the disc gear 17 to rotate, thereby to exert a rotating force on the gear train 16. Consequently, by moving the lever arm 6 in a direction that causes the indicating pointers 2–4 to rotate in a down-scale direction, it is possible to move the pointers 2–4 to their zero indicating position, as shown in FIG. 1.

However, as noted at the outset above, if the gear train 16 were simply rotated by movement of the lever arm 6 to position the indicating pointers 2–4 in their zero-indicating position, an appreciable error might be introduced into a subsequent demand reading indication on the dial register 1, due to backlash that is present in the drive gear train 16. The zero-reset mechanism of the present invention includes novel features that obviate the risk of such erroneous demand meter readings being shown on dial register 1 as the result of a zero-resetting operation. These features will now be described.

Pursuant to the present invention, the adjustable stop member 8 is mounted adjacent the lever arm 6 of rotatable means 49 and is effective to discontinue the force exerted by the rotatable means 49 on the gear train 16, in response to the rotatable means 49 being moved to a predetermined point where lever arm 6 is in contact with the stop member 8, as shown in FIG. 1. In addition, a resiliently loaded means 51 is directly coupled to the rotatable means 49, for a purpose that will be described below. In the preferred embodiment of the invention, the resiliently loaded means comprises a pre-loaded spring (51) that is coupled to the rotatable means 49 by being integrally formed as a part of lever arm 6. The spring 51 is operable to cooperate with the stop member 8, when it is moved into engagement therewith, to exert a force on the rotatable means 49, to cause it to move the indicating pointer 2 to its zero-indicating position; in response to the rotatable means being manually operated to move the pointer 2 past its zero-indicating position in a down-scale direction to a predetermined point where the rotating force exerted on the gear train 16 by the rotatable means 49 is discontinued by the stop member 8. Of course, spring 51 will not move pointer 2 to its zero-indicating position until the normal rotating force exerted on lever arm 6 is sufficiently diminished to free the lever arm 6 for up-scale rotation.

It should be understood that the resilient spring 51 must be capable of exerting a force sufficient to overcome the forces of inertia and friction in the rotatable means 49 and the gear trains 16 and 43, and indicating pointers 2–4 coupled thereto, so that it can move the lever arm 6 and thereby drive the pointer 2 to its zero-indicating position; after an operator has manually rotated the lever arm 6 in a counter-clockwise direction, as seen in FIG. 1, to move the pointer 2 past its zero-indicating position in a down-scale direction, and then released the lever arm 6. Another important feature of the invention is the provision of means for preventing the lever arm 6 from being moved away from the stop member 8 so rapidly that it tends to over-drive the indicating pointers 2–4 and cause them to give a false indication of demand reading. In order to provide this function, the lever arm 6 is formed in a generally U-shaped configuration, as best seen in FIGS. 2 and 5, so that it can cooperate with a conventional glass meter cover (not shown) of the demand meter, thereby to serve as a braking means, which is operable to exert a friction force on the rotatable means 49 to restrict its movement after it is released by an operator performing a zero-resetting operation. In this form of the invention, the outer end 6a (see FIG. 5) of lever arm 6 is adapted to exert a friction pressure on a glass meter cover to attain this desirable damping action of the arm 6.

In order to assure a consistent and accurate movement of the rotatable means 49 by the spring 51, as mentioned above, the spring 51 is pre-loaded so that the force exerted by it on the rotatable means 49, after the spring is moved into contact with the stop member 8, is always at least greater than the forces of friction and inertia that tend to retain the indicating pointers 2–4, and gear train 16, in a position where these pointers are down-scale from their zero-indicating position. To afford this unique pre-loading function in the disclosed preferred embodiment of the invention, the spring 51, as best seen in FIGS. 6 and 7, is pre-loaded by biasing it into a slot 52 in the hub member 50. As seen in FIG. 6, the inner end of spring 51 is closer to the rigid portion of lever arm 6 than is its outer end. Of course, the amount of pre-loading necessary for the spring 51 in given applications of the invention will be dependent on the friction of drive gear train 16 and the moment of inertia of the rotatable means 49 and indicating pointers 2–4. However, in order to practice the present invention, it is only necessary to understand that the pre-loading of spring 51 should be sufficient to exert the minimum amount of pressure described above so that it always cooperates with the stop member 8 to move the indicating pointer 2 exactly to its zero-indicating position.

It is desirable to make the slot 51a, which separates spring 51 from lever arm 6, relatively narrow, so that spring 51 will be moved into contact with the arm 6 before the limits of resilience of spring 51 are exceeded. Such a precaution assures the maintenance of a uniform resilient force in spring 51.

It should be understood that prior to placing the zero-reset mechanism of the preferred embodiment of the invention into operation, it is necessary to calibrate it so that it will accurately return the indicating pointers 2-4 of dial register 1 to their respective zero-indicating positions. Such calibration is accomplished by manually rotating the lever arm 6 sufficiently far in a counter-clockwise direction, as seen in FIG. 1, so that all of the backlash in drive gear train 16 is taken up, and so that each of the indicating pointers 2-4 are in a down-scale position from their zero-indicating positions. Then, pressure is released on the lever arm 6 so that the spring 51 is barely maintained in engagement with the stop member 8. Stop member 8 is then rotated about its eccentric mounting pin 9 to move the lever arm 6 and, thus, indicating pointers 2-4 (normally only the indicating pointer 2 will be moved appreciably) to place them exactly at their zero-indicating positions. By repeating this manual-reset and calibrating operation several times the adjustable stop member 8 will finally be exactly positioned at a mean point such that it will effectively cooperate thereafter with the spring member 51 to accurately return the indicating pointer 2 (and associated pointers 3 and 4) to its zero-indicating position in all subsequent zero-resetting operations.

From the foregoing description of the invention it is believed that those skilled in the art will fully understand it and be able to readily practice the invention. However, two further important features of the invention should be pointed out. First, it should be understood that it is desirable to reduce the load placed on input drive gear 25 by the drive gear train 16, as much as possible. Toward this end, the friction and inertia of the gear train 16 is made as low as possible. However, it will be observed that the lever arm 6 and pin 39 have appreciable masses that are eccentrically positioned with respect to the axis of rotation of gear 17, to which they are directly coupled. Accordingly, in order to overcome the eccentric loading of the drive gear train 16 by the rotatable means 49 and pin 39, a counter-balance weight 53 is mounted on the gear 17 at a position where it essentially nullifies the tendency of these eccentrically positioned masses to rotate the gear 17 and thereby distort the demand measurements indicated by dial register 1.

A second important feature of the invention is that the manually operable zero-reset mechanism cannot overload, or unduly strain, the drive gear train 16, during a reset operation. This safeguard is provided by designing the slot 11a, which receives pin 39, so that pin 39 cannot contact the "down-scale" end of the slot. As pointed out above, "down-scale" movement of pin 39 is discontinued when lever arm 6 is stopped by stop member 8. Accordingly, no matter how much force is manually applied to lever arm 6, the drive gear train 16 will not be strained or overloaded, because it is free to rotate (pin 39 does not contact the "down-scale" end of slot 11a), rather than being stopped, then overloaded.

It will be apparent to those skilled in the art from the foregoing description of the invention that various improvements and modifications can be made in it without departing from the true scope of the invention. Accordingly, it is my intention to encompass within the scope of the appended claims the true limits and spirit of my invention.

What I claim as new and desire to secure by Letters Patent of the United States is:

1. A zero-reset mechanism operatively mounted on an electric demand meter for accurately resetting to a zero position a gear-train-actuated dial register pointer for indicating electric demand, comprising a dial register having a scale with a zero-indicating position and having a rotatably mounted indicating pointer that cooperates with the scale, a drive gear train operatively coupled to rotate said pointer in response to the gear train being driven, drive means for driving said gear train to move said pointer in an up-scale direction, manually operable rotatable means for exerting a rotating force on said gear train in a reverse direction thereby to move said pointer in a down-scale direction past said zero-indicating position, an adjustable stop member mounted adjacent said rotatable means and effective to discontinue the force exerted by said rotatable means on said gear train in response to the rotatable means being moved to a predetermined point with respect to said stop member, resiliently loaded means coupled to said rotatable means, said resiliently loaded means being operable to cooperate with said stop member to exert a force on said rotatable means to cause it to move said pointer to its zero-indicating position in response to said rotatable means being operated to move said pointer past its zero-indicating position in a down-scale direction to said predetermined point where the rotating force exerted on the gear train by the rotatable means is discontinued.

2. An invention as defined in claim 1 wherein said rotatable means comprises a manually operable lever arm that is mounted in fixed relationship to one gear of said gear train, and wherein said resiliently loaded means comprises a pre-loaded spring mounted on said lever arm.

3. An invention as defined in claim 2 wherein said spring is pre-loaded so that the force exerted by it on said rotatable means, after the spring is moved into contact with the stop member where its cooperative relationship with the stop member causes the spring to be further loaded, is always at least greater than the forces of friction and inertia tending to retain the pointer and gear train in a position where the pointer is down-scale from its zero-indicating position, whereby the spring is effective to move the pointer accurately and consistently to said zero position.

4. An invention as defined in claim 2 wherein said spring is formed as an integral part of said lever arm.

5. An invention as defined in claim 3 including braking means mounted adjacent said rotatable means, said braking means being operable to exert a friction force on said rotatable means that restricts the movement thereof, whereby said pointer is prevented from being driven by the spring past said zero-indicating position in an up-scale direction, and wherein the pre-loading of said spring is adequate to overcome the friction force of said braking means sufficiently to move the pointer consistently to said zero-indicating position.

6. An invention as defined in claim 2 wherein said lever arm has a mass that is eccentrically positioned with respect to the axis of rotation of said one gear of said gear train, and including a counter-balance weight mounted on said one gear at a position where it essentially nullifies the tendency of the eccentrically positioned mass of said lever arm to rotate said one gear.

7. An invention as defined in claim 2 wherein said zero-reset mechanism is operatively mounted in an electric demand meter in which said dial register is operatively connected to indicate electric demand, said demand meter including a housing comprising a base member and a transparent cover, said dial register being positioned within said cover so it is visible through the cover, and said adjustable stop member being made readily accessible for adjustment at the front of said meter.

8. An invention as defined in claim 7 wherein said dial register is a multi-dial register having a plurality of rotatably mounted pointers each positioned to cooperate, respectively with one of said dials, each of said pointers being coupled respectively to a different gear of a decade gear train.

9. An invention as defined in claim 2 including a limit stop means that is effective to stop the movement of said drive gear train in a "down-scale" direction in response to a member driven by said train being moved into contact with said limit stop means, and wherein said adjustable stop member is positioned to be effective to discontinue the force exerted by said rotatable means on said gear train before it is operated to drive said driven member into contact with the limit stop means, thereby to prevent an overload force from being applied to said gear train by movement of said rotatable means when the gear train is held in a fixed position by said limit stop means.

* * * * *